(12) United States Patent
Ma et al.

(10) Patent No.: US 11,581,833 B2
(45) Date of Patent: Feb. 14, 2023

(54) ACTIVE DAMPING CONTROL METHOD AND SYSTEM FOR SUB-SYNCHRONOUS OSCILLATION OF DFIG, AND STORAGE MEDIUM

(71) Applicant: NORTH CHINA ELECTRIC POWER UNIVERSITY, Beijing (CN)

(72) Inventors: Jing Ma, Beijing (CN); Yaqi Shen, Beijing (CN); Yuchong Wu, Beijing (CN); Ruifeng Wang, Beijing (CN)

(*) Notice: Subject to any disclaimer, the term of this patent is extended or adjusted under 35 U.S.C. 154(b) by 0 days.

(21) Appl. No.: 17/372,417

(22) Filed: Jul. 10, 2021

(65) Prior Publication Data

US 2022/0021321 A1    Jan. 20, 2022

(30) Foreign Application Priority Data

Jul. 15, 2020    (CN) .......................... 202010681459.8

(51) Int. Cl.
*H02P 9/00*    (2006.01)
(52) U.S. Cl.
CPC .................................. *H02P 9/007* (2013.01)
(58) Field of Classification Search
CPC ........ H02J 3/381; H02J 2300/28; H02J 3/241; Y02E 10/76; H02P 9/02; H02P 9/007; H02P 9/105
See application file for complete search history.

(56) References Cited

U.S. PATENT DOCUMENTS 10,622,923 B2 *    4/2020    Andersen ................ H02P 9/006

FOREIGN PATENT DOCUMENTS

CN    109617121 A    *    4/2019    ............... H02J 3/01

OTHER PUBLICATIONS

D. H. R. Suriyaarachchi, et al., "A procedure to study sub-synchronous interactions in wind integrated power systems," IEEE Trans. Power Systems, vol. 28, pp. 377-384, Jul. 2012.
R. K. Patnaik, et al., "Adaptive terminal sliding mode power control of DFIG based wind energy conversion system for stability enhancement," International Transactions on Electrical Energy Systems, vol. 26, pp. 750-782, Jun. 2016.
(Continued)

*Primary Examiner* — Julio C. Gonzalez
(74) *Attorney, Agent, or Firm* — Analects Legal LLC

(57) ABSTRACT

The disclosure relates to an active damping control method and system for sub-synchronous oscillation of DFIG, and storage medium. The method comprises the following steps: collecting oscillation components of stator current and/or stator voltage; determining each energy branch in DFIG converter according to the flow path of the oscillation component(s) of the stator current and/or the stator voltage in DFIG converter; determining the corresponding function of each energy branch according to oscillation component(s) the stator current and/or the stator voltage; determining the energy compensation branch and its corresponding energy compensation function in DFIG converter according to the corresponding function of each energy branch and converter parameters; controlling the sub-synchronous oscillation of DFIG by controlling the energy compensation branch according to the energy compensation function.

6 Claims, 15 Drawing Sheets

(56) References Cited

OTHER PUBLICATIONS

J. L. Dominguez-Garcia, et al., "Power oscillation damping supported by wind power: a review," Renewable and Sustainable Energy Reviews, vol. 16, pp. 4994-5006, Sep. 2012.
M. R. A. Pahlavani, et al., "Damping of sub-synchronous resonance and low-frequency power oscillation in a series-compensated transmission line using gate-controlled series capacitor," Electric Power Systems Research, vol. 81, pp. 308-317, Feb. 2011.
Moharana, et al., "SSR Alleviation by STATCOM in induction-generator-based wind farm connected to series compensated line," IEEE Trans. Sustain. Energy, vol. 5, No. 3, pp. 947-957, Jul. 2014.
H. Xie, et al., "Subsynchronous resonance characteristics in presence of doubly-fed induction generator and series compensation and mitigation of subsynchronous resonance by proper control of series capacitor," IET Renewable Power Generation, vol. 8, No. 4, pp. 411-421, May 2014.
Liu, Huakun, et al., "Mitigation of SSR by embedding subsynchronous notch filters into DFIG converter controllers." IET Generation, Transmission & Distribution, vol. 11, No. 11, pp. 2888-2896, 2017.
Chen, Aikang, et al., "PI Parameter Tuning of Converters for Sub-Synchronous Interactions Existing in Grid-connected DFIG Wind Turbines." IEEE Transactions on Power Electronics (2018):1-1.
L. Wang, et al., "Investigation of SSR in practical DFIG-based wind farms connected to a series compensated power system," IEEE Trans. Power Syst., vol. 30, pp. 2772-2779, Sep. 2015.
Song, Yipeng, et al., "Doubly Fed Induction Generator System Resonance Active Damping through Stator Virtual Impedance." IEEE Transactions on Industrial Electronics, vol. 64, No. 1, pp. 125-137, Jan. 2017.
Leon, Andres E., and J. A. Solsona. "Sub-Synchronous Interaction Damping Control for DFIG Wind Turbines." IEEE Transactions on Power Systems, vol. 30, No. 1, pp. 419-428, 2015.
X Xiao et al., "A new subsynchronous torsional interaction and its mitigation countermeasures." Energytech, 2013 IEEE IEEE, 2013.

* cited by examiner

ACTIVE DAMPING CONTROL METHOD AND SYSTEM FOR SUB-SYNCHRONOUS OSCILLATION OF DFIG, AND STORAGE MEDIUM

CROSS-REFERENCE TO RELATED APPLICATIONS

This disclosure claims priority to Chinese Patent Disclosure No. 202010681459.8, filed on Jul. 15, 2020, which is hereby incorporated by reference in their entirety.

TECHNICAL FIELD

The present disclosure relates to the technical field of wind power generation, in particular to an active damping control method and system for sub-synchronous oscillation of DFIG (Doubly fed Induction Generator), and storage medium.

BACKGROUND

When the DFIG wind farm is power transmitting through series compensation system, the sub-synchronous oscillation will trigger a network disconnection accident of the wind farm, which seriously threatens safe and stable operation of the power system. At present, suppression measures of sub-synchronous oscillation of DFIG connected system have become a hot topic of many experts and scholars at home and abroad.

However, existing control strategies are still limited to a certain oscillation frequency point for active suppression, but when the oscillation frequency changes due to the change of system operation mode, existing methods are difficult to meet the damping requirements in the changing scenarios. At the same time, the existing control strategies mainly improve the stability of the sub-synchronous frequency band of wind turbine, and rarely take into account the super-synchronous frequency band and the fundamental frequency band, which makes the existing control strategies have control blind spots, thus reducing accuracy and efficiency of the control strategies.

SUMMARY

In view of the above analysis, the disclosure aims to propose an active damping control method and system for sub-synchronous oscillation of DFIG, and storage medium, to the accuracy and efficiency of the control strategies.

The object of the disclosure is mainly realized through the following technical scheme:

For the first aspect, embodiment of present disclosure provides an active damping control method for sub-synchronous oscillation of DFIG including:

collecting oscillation component(s) of stator current and/or stator voltage;

according to flow path of the oscillation component(s) of the stator current and/or the stator voltage in DFIG converter, determining each energy branch in the DFIG converter;

according to the oscillation component(s) of the stator current and/or the stator voltage, determining the corresponding function of each energy branch;

according to the corresponding function of each energy branch and converter parameters, determining energy compensation branch and its corresponding energy compensation function in the DFIG converter;

according to the energy compensation function, controlling the sub-synchronous oscillation of the DFIG by controlling the energy compensation branch.

Furthermore, each energy branch in DFIG converter includes: each energy branch in the excitation converter of DFIG and each energy branch in the grid side converter of DFIG.

Furthermore, according to the stator current, the general formula of the function corresponding to each energy branch in DFIG converter is determined, as shown in the following Formula 1:

$$\Delta W_{DFIG} = \frac{1}{2}\xi(\omega)\Delta i_{dqs}^2 - \int \eta(\omega)\Delta i_{dqs}^2 dt \qquad \text{Formula 1}$$

Where $\Delta i_{dqs}$ are d-axis and q-axis oscillation component of stator current; $\omega$ is oscillation frequency; $\xi(\omega)$ is a potential energy coefficient; $\eta(\omega)$ is a dissipation energy coefficient.

The ratio of the potential energy coefficient and the dissipation energy coefficient is constructed as stability coefficient index, as shown in the following formula 2.

$$\mu(\omega) = \frac{\eta(\omega)}{\xi(\omega)} \qquad \text{Formula 2}$$

according to the stability coefficient index and the corresponding function of each energy branch, determining the energy change quantity and energy change trend identification of each energy branch;

determining target energy branch according to the energy change quantity and the energy change trend identification;

according to the target energy branch and its function, determining the corresponding energy compensation branch and its energy compensation function;

Where the energy change quantity includes potential energy change quantity and dissipation energy change quantity, and the energy change trend identification includes potential energy change trend identification and dissipation energy change trend identification; the energy compensation branch comprises a reverse potential energy compensation branch and a reverse dissipation energy compensation branch.

According to the function of the stator voltage component and the potential energy of the target energy branch, determine the potential energy increment of the target energy branch;

According to the potential energy increment of the target energy branch, determine the reverse potential energy compensation branch and its corresponding function, where the reverse potential energy compensation branch is used to offset the potential energy increment.

According to the function of the stator voltage component and the dissipation energy of the target energy branch, determine the dissipation energy increment of the target energy branch;

According to the dissipation energy increment of the target energy branch, determine the reverse dissipation energy compensation branch and its corresponding function, wherein the reverse dissipation energy compensation branch is used to offset the dissipation energy increment.

Furthermore, with the energy compensation function, calculate the variation of the rotor current and the stator voltage caused by the energy compensation branch;

Detecting whether the variation of the rotor current and the variation of the stator voltage meet the conditions for the stability of the fundamental frequency dynamic characteristics of DFIG;

Executing the energy compensation branch when the variation of the rotor current and the variation of the stator voltage meet the conditions for the stability of the fundamental frequency dynamic characteristics of DFIG.

Furthermore, when the variation of the rotor current and the variation of the stator voltage do not meet the energy stability conditions of the wind turbine, optimize the parameters in the compensation function by taking the sub/super-synchronous frequency stability coefficient ratio as the objective function and the energy compensation branch meeting the sub/super-synchronous frequency stability requirement as the constraint condition;

Where the objective function is:

$$\sigma = \left| \frac{S_{sub}}{S_{super}} \right|$$

$$S_{sub}(K) = \int_{\omega_1}^{\omega_2} \mu(\omega, K) d\omega - \int_{\omega_1}^{\omega_2} \mu(\omega, K) d\omega$$

$$S_{super}(K) = \int_{\omega_1}^{\omega_2} \mu(\omega, K) d\omega - \int_{\omega_1}^{\omega_2} \mu(\omega, K) d\omega$$

Where $\sigma$ is stability coefficient ratio of sub/super-synchronous frequency; $\omega_1$, $\omega_2$ are selected as upper and lower limits of sub-synchronous and super-synchronous frequency bands; $S_{sub/super}(K)$ characterizes influence degree of energy compensation branch on stability coefficient in sub/super-synchronous frequency band.

The constraint condition is:

$$s.t. \begin{cases} \min_{5 \leq \omega \leq 95} \eta(\omega, K) > 0 \\ \min_{5 \leq \omega \leq 95} \xi(\omega, K) > 0 \end{cases}$$

Where $\xi(\omega,K)$ is the potential energy coefficient; $\eta(\omega,K)$ is the dissipation energy coefficient.

For the second aspect, embodiment of present disclosure provides an active damping control system for sub-synchronous oscillation of DFIG including an acquisition device, a first processor of data processing and a controller;

the acquisition device is used for acquiring oscillation components of stator current and stator voltage;

the first processor of data processing is used to determine each energy branch in DFIG converter according to flow path of oscillation components of the stator current and the stator voltage in DFIG converter; according to oscillation components of the stator current and the stator voltage, determine the corresponding functions of each energy branch; according to the corresponding functions of each energy branch, determine the energy compensation branch and its corresponding energy compensation function in DFIG converter;

the controller is used to control the sub-synchronous oscillation of DFIG by controlling the energy compensation branch according to the energy compensation function.

Furthermore, the system also comprises: a second processor of parameter optimization;

The second processor of parameter optimization is used to optimize the parameters in the compensation function to meet the stability requirement of the wind turbine in both sub-synchronous and super-synchronous frequency band, taking stability coefficient ratio of the sub/super-synchronous frequency as the objective function and the energy compensation branch meeting the sub/super-synchronous frequency stability requirement as the constraint condition;

Where the objective function is:

$$\sigma = \left| \frac{S_{sub}}{S_{super}} \right|$$

$$S_{sub}(K) = \int_{\omega_1}^{\omega_2} \mu(\omega, K) d\omega - \int_{\omega_1}^{\omega_2} \mu(\omega, K) d\omega$$

$$S_{super}(K) = \int_{\omega_1}^{\omega_2} \mu(\omega, K) d\omega - \int_{\omega_1}^{\omega_2} \mu(\omega, K) d\omega$$

Where $\sigma$ is stability coefficient ratio of sub/super-synchronous frequency; $\omega_1$, $\omega_2$ are selected as upper and lower limits of sub-synchronous and super-synchronous frequency bands; $S_{sub/super}(K)$ characterizes influence degree of energy compensation branch on stability coefficient in sub/super-synchronous frequency band.

The constraint condition is:

$$s.t. \begin{cases} \min_{5 \leq \omega \leq 95} \eta(\omega, K) > 0 \\ \min_{5 \leq \omega \leq 95} \xi(\omega, K) > 0 \end{cases}$$

Where $\xi(\omega,K)$ is the potential energy coefficient; $\eta(\omega,K)$ is the dissipation energy coefficient.

Either of the first processor, the second processor is independent processor, or both processors are integrated in a single processor.

The beneficial effect of the technical scheme of the disclosure is as follows:

1. The embodiment of the present disclosure provides an active damping control method and system for sub-synchronous oscillation of DFIG. Based on the sub-synchronous oscillation state of the wind turbine, the energy branch and its corresponding function are created. The energy branch and its corresponding function respectively reflect the energy change of the wind turbine caused by sub-synchronous oscillation from two aspects of potential energy and dissipation energy, the precondition of realizing the energy control of the wind turbine is provided without limitation on a single resonant frequency point.

2. According to the stability coefficient index and the corresponding function of each energy branch, the energy change quantity and energy change trend identification of each energy branch are determined. According to the energy change quantity and energy change trend identification, the energy branch which can significantly change the potential energy and energy consumption of DFIG after the oscillation is determined as the target energy branch, which can reduce the data processing amount and save the operation time.

3. According to the potential energy and energy consumption of the DFIG of the target energy branch, the energy compensation branch, namely the control strategy, is determined, which can improve the control accuracy and control effect of the control strategy, and take into account the compensation requirements of potential energy and energy consumption in the super synchronous frequency band, so as to realize the energy optimization remodeling in the sub/super synchronous full frequency band.

4. According to the energy compensation function, the effect of the control strategy is deduced in advance. When the effect of the control strategy cannot meet the stability requirement in both the sub-synchronous and super-synchronous frequency band of the system, the parameters of the compensation function are optimized with the sub/super-synchronous frequency stability coefficient ratio as the objective function and the energy compensation branch meeting the sub/super synchronous frequency stability requirements as the constraint condition, so as to further optimize the control strategy.

Other features and advantages of the disclosure will be described in the subsequent description, and some of them become apparent from the description or are understood by the implementation of the disclosure. The purpose and other advantages of the disclosure can be realized and obtained by the description, claims and the structure specially noted in the attached figures.

BRIEF DESCRIPTION OF DRAWINGS

The figures are only for the purpose of illustrating specific embodiments and are not considered to be a limitation of the present disclosure. Throughout the figures, the same reference symbols denote the same components.

DESCRIPTION OF EMBODIMENTS

The following is a detailed description of the preferred embodiments of the disclosure in combination with the accompanying drawings, where the accompanying drawings form a part of the disclosure and are used together with the embodiments of the disclosure to explain the principle of the disclosure, rather than to limit the scope of the disclosure.

Figure 1:
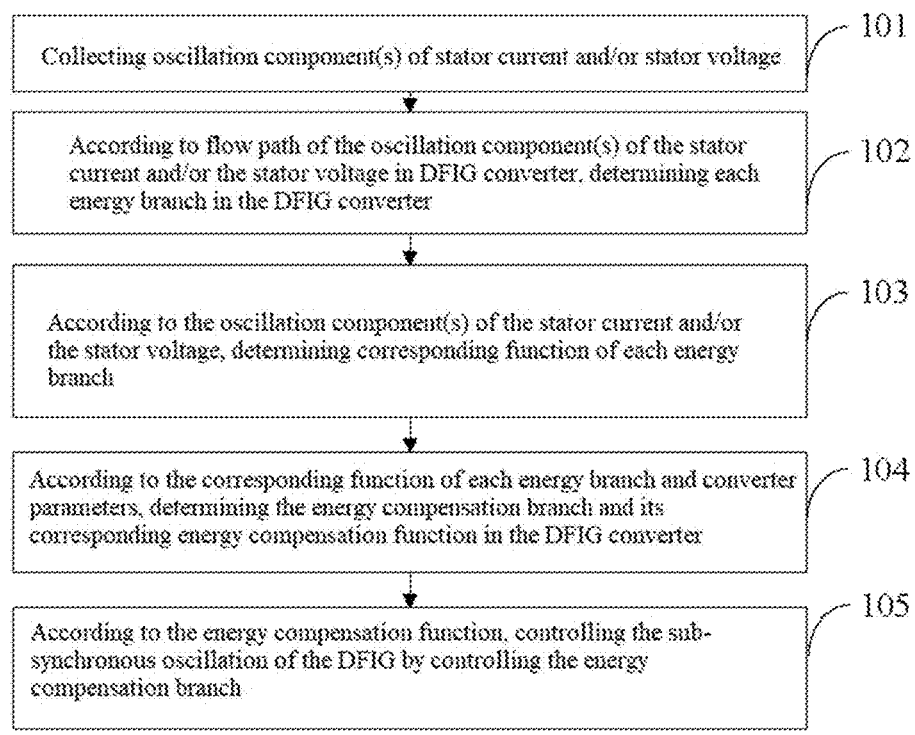
FIG. 1 is a flow chart of an active damping control method for sub-synchronous oscillation of DFIG in the disclosure.

As shown in FIG. 1, the embodiment of the disclosure provides an active damping control method for sub-synchronous oscillation of DFIG including the following steps:

In step 101, collect the oscillation components of stator current and/or stator voltage.

In the embodiment of the disclosure, the stator voltage oscillation component is the sub-synchronous oscillation component in the stator voltage under the sub-synchronous oscillation state, and the expression is as follows:

$$\Delta u_s = u_s - u_{s0}$$

Where $u_s$ is a current stator voltage, $u_{s0}$ is an initial value of stator voltage. It can be understood that the stator voltage after the sub synchronous oscillation is the current stator voltage, and the stator voltage before the sub synchronous oscillation is the initial value of the stator voltage.

$\Delta u_{ds}$ and $\Delta u_{qs}$ are respectively the variation of d-axis and q-axis components of stator voltage. $\Delta i_{sd}$ and $\Delta i_{sq}$ are respectively the variation of d-axis and q-axis components of stator current. There is a quantitative relationship between them:

$$\begin{cases} \Delta u_{sd} = R\Delta i_{sd} + L\dfrac{d\Delta i_{sd}}{dt} - \omega_s L\Delta i_{sq} - \dfrac{1}{\omega_d - \omega_s}\dfrac{1}{C}\Delta i_{sq} \\ \Delta u_{sq} = R\Delta i_{sq} + L\dfrac{d\Delta i_{sq}}{dt} + \omega_s L\Delta i_{sd} + \dfrac{1}{\omega_d - \omega_s}\dfrac{1}{C}\Delta i_{sd} \end{cases}$$

where R, L and C are respectively the resistance, inductance and capacitance of series compensation line.

In view of the quantitative relationship between them, oscillation component of the stator current or voltage can be used for subsequent calculation alone, or oscillation components of the stator current and the stator voltage can be used for subsequent calculation at the same time. Therefore, in the embodiment of the disclosure, the stator voltage oscillation component can be characterized by the stator current, so as to eliminate the stator voltage oscillation component in the formula and simplify the calculation.

In step 102, according to the flow path of the oscillation component(s) of the stator current and/or the stator voltage in DFIG converter, determine each energy branch in DFIG converter.

In the embodiment of the disclosure, the energy branch is the flow path of oscillation components of stator current and stator voltage in the DFIG converter. DFIG converter includes: excitation converter and grid side converter.

In step 103, according to the flow path of oscillation component(s) of the stator current and/or the stator voltage in the DFIG converter, determine the corresponding functions of each energy branch in the DFIG converter.

In the embodiment of the disclosure, the general formula of each function is determined according to the stator current, as shown in the following Formula 1

$$\Delta W_{DFIG} = \frac{1}{2}\xi(\omega)\Delta i_{dqs}^2 - \int \eta(\omega)\Delta i_{dqs}^2 dt \quad \text{Formula 1}$$

Where $\Delta i_{dqs}$ are d-axis and q-axis oscillation component of stator current, $\omega$ is the oscillation frequency; the $1^{st}$ part in Formula 1 is potential energy term which only has to do with the initial values of state variables and represents the system energy accumulated during disturbance, $\xi(\omega)$ is defined as potential energy coefficient, which reflects the ability of system to accumulate energy during disturbance. The $2^{nd}$ part is dissipation term related with the integration path, which represents the system to consume during disturbance, $\eta(\omega)$ is defined as dissipation energy coefficient, which reflects the ability of system to dissipate the energy accumulated during oscillation.

It should be noted that the initial formula of Formula 1 is as follows:

$$\Delta W_{DFIG} = \frac{1}{2}\xi(\omega)\Delta i_{dqs}^2 - \int \eta(\omega)\Delta i_{dqs}^2 dt + \int \zeta(\omega)\Delta i_{ds}\Delta i_{qs} dt \quad \text{Formula 1}$$

However, in the embodiment of the disclosure, in the initial formula of Formula 1, the last item will not affect the change of system potential energy and consumed energy, so this item will not be discussed in the embodiment of the disclosure.

In step 104, according to the corresponding functions and converter parameters of each energy branch, determine the energy compensation branch and its corresponding energy compensation function in DFIG converter.

In the embodiment of the disclosure, the converter parameters are set at time of DFIG converter shipping out of factory, including proportional gain parameters of active outer loop, proportional gain parameters of reactive outer loop and proportional gain parameters of current inner loop.

In step 105, according to the energy compensation function, control the sub-synchronous oscillation of DFIG by controlling the energy compensation branch.

Figure 12:
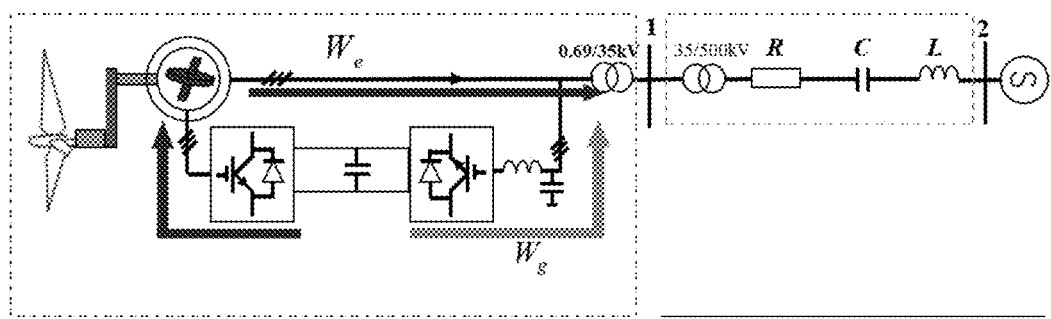
FIG. 12 is a circuit diagram of the wind turbine provided by the embodiment of the present disclosure.

There are multiple energy branches in the excitation converter and grid side converter of wind turbine. As shown in FIG. 12, the energy branches of wind turbine mainly include each energy branch in the excitation circuit ($W_e$) of DFIG and each energy branch in the grid side circuit ($W_g$). Therefore, in the embodiment of the disclosure, it is necessary to first determine energy of which energy branches will affect the system stability in the sub-synchronous oscillation state.

Due to different control structures, when the system is disturbed to generate sub-synchronous oscillation, each energy branch will accumulate part of the oscillation energy and dissipate part of the oscillation energy. Therefore, in the embodiment of the disclosure, the system energy accumulated in the disturbance process is defined as potential energy, which is represented by potential energy coefficient and potential energy function; The dissipated cumulative energy is the dissipated energy, which is represented by the dissipated energy coefficient and the dissipated energy function.

It can be seen that after the energy oscillation occurs, the energy generated in each energy branch is determined by the potential energy and the dissipated energy. Based on this, the embodiment of the disclosure proposes the stability coefficient index, as shown in formula 2

$$\mu(\omega) = \frac{\eta(\omega)}{\xi(\omega)} \quad \text{Formula 2}$$

It can be seen from Formula 2 that, the bigger dissipation energy coefficient $\eta(\omega)$ is and the smaller potential energy coefficient $\xi(\omega)$ is, the higher system stability coefficient, $\mu(\omega)$ is, and the faster the potential energy accumulated during oscillation is consumed, i.e. the higher system stability level is in this frequency band. Therefore, based on the above principle, the embodiment of the disclosure will formulate a control strategy for the energy branch with more potential energy accumulation and lower dissipated energy in the oscillation state, so as to reduce potential energy accumulation and improve dissipated energy.

The specific process is as follows:

1) According to the stability coefficient index and the corresponding function of each energy branch, the energy change quantity and energy change trend identification of each energy branch are determined.

In the embodiment of the disclosure, the energy change quantity includes the potential energy change quantity and the dissipation energy change quantity, and the energy change trend identification includes the potential energy change trend identification and the dissipation energy change trend identification. The energy change trend identification refers to the plus or minus sign of potential energy coefficient. For example, if the potential energy coefficient in the energy branch of excitation voltage is greater than 0, the energy change trend identification is positive.

For the excitation channel, its potential energy component is mainly affected by the excitation voltage energy branch, and its corresponding potential energy coefficient expression is as follows:

$$\Delta \xi_{ur}(\omega) = \frac{1}{a_1}(K_{p1}K_{p3} + K_{p2}K_{p3})I_{ds0}\left[(\omega_d - \omega_s)L - \frac{1}{\omega_d - \omega_s}\frac{1}{C}\right]$$

where $K_{p1}$ is PI parameters of active power outer loop, $K_{p2}$ is PI parameters of reactive power outer loop, $K_{p3}$ is PI parameters of current inner loop. $\omega_s$ is synchronous speed, $\omega_d = \omega_s - \omega_n$ is the oscillation frequency of system in dq coordinate system. $L_s$, $L_r$ and $L_m$ are the equivalent stator inductance, rotor inductance and mutual inductance in dq coordinate system, $I_{ds0}$ is the initial values of d-axis of stator current. L and C are respectively the inductance and capacitance of series compensation line.

It can be seen from the above formula, the potential energy coefficient in excitation voltage energy branch is positive, i.e. during oscillation, the oscillation component of stator voltage will accumulate potential energy through excitation voltage energy branch. The higher the oscillation frequency is, the bigger the potential energy coefficient of the system is, and the more potential energy will be accumulated in the process of oscillation. System stability coefficient will drop, which makes against the rapid convergence of oscillation. In order to reduce the potential energy accumulated in the process of oscillation and increase the stability coefficient of the system, it is necessary to establish a potential energy compensation branch in the excitation voltage energy branch which is opposite to the oscillation frequency change to offset the positive potential energy accumulated in the system and improve the stability level of the system.

The dissipation energy in excitation energy channel is jointly generated by three energy branches. Since the value of generator rotor resistance is much smaller than the dissipation energy coefficients of excitation voltage and current energy branches, the dissipation energy generated by generator energy branches is much smaller than the dissipation energy generated by excitation voltage energy branch and excitation current energy branch, excitation voltage energy branch and excitation current energy branch are analysed in present description. The dissipation energy coefficients of these two branches are respectively:

$$\Delta\eta_{ir}(\omega) = -\frac{1}{a_1}K_{p3}\omega_d + \frac{1}{a_1}\frac{1}{\omega_d}K_{i2}K_{i3}U_{ds0} +$$
$$\frac{1}{a_1}\frac{1}{\omega_d}K_{i1}K_{i3}U_{ds0} - \frac{1}{a_1}K_{p2}K_{p3}U_{ds0} - \frac{1}{a_1}K_{p1}K_{p3}U_{ds0}$$

$$\Delta\eta_{ur}(\omega) = -\frac{1}{a_1}K_{i1}K_{p3}I_{ds0}\left[(\omega_d-\omega_s)L - \frac{1}{\omega_d-\omega_s}\frac{1}{C}\right] + \frac{1}{a_1}K_{p1}K_{p3}I_{ds0}\omega_d R -$$
$$\frac{1}{a_1}K_{i1}K_{i3}I_{ds0}R\frac{1}{\omega_d} + \frac{1}{a_1}K_{p1}K_{i3}I_{ds0}\left[(\omega_d-\omega_s)L - \frac{1}{\omega_d-\omega_s}\frac{1}{C}\right] -$$
$$\frac{1}{a_1}K_{i2}K_{p3}I_{ds0}\left[(\omega_d-\omega_s)L - \frac{1}{\omega_d-\omega_s}\frac{1}{C}\right] + \frac{1}{a_1}K_{p2}K_{p3}I_{ds0}\omega_d R -$$
$$\frac{1}{a_1}K_{i2}K_{i3}I_{ds0}R\frac{1}{\omega_d} + \frac{1}{a_1}K_{p2}K_{i3}I_{ds0}\left[(\omega_d-\omega_s)L - \frac{1}{\omega_d-\omega_s}\frac{1}{C}\right]$$

Where R is the resistance of the series compensated line, $K_{i1}$ is integral gain parameter of the active outer loop, $K_{i2}$ is integral gain parameter of the reactive outer loop, $K_{i3}$ is integral gain parameter of the current inner loop.

It can be seen from the above formula, the terms containing $K_i$ in excitation current energy branch are all negative. However, since the value of $\omega_d$ is much larger than the values of PI control parameters, the terms containing $\omega_d^{-1}$ can all be neglected. Thus the dissipation energy coefficient of excitation current energy branch is positive, i.e. it has positive contribution to system stability coefficient.

There is a negative dissipation energy coefficient term in the energy branch of excitation voltage, which is generated by the coupling of series compensated line and rotor converter control. The dissipation energy coefficient will decrease with the increase of $\omega_d$ and the degree of series compensation, then stability coefficient of the system will also decrease, which is not conducive to the rapid convergence of the oscillation.

The potential energy in grid-side energy channel is mainly generated by filtering reactance energy branch and voltage outer loop energy branch, and the corresponding potential energy coefficients are respectively:

$$\Delta\xi_{ug}(\omega) = -\frac{K_{p5}K_{p4}}{C}I_{dr0}K_{p1}K_{p3}I_{ds0}a_3\frac{1}{2}\left[(\omega_d-\omega_s)L - \frac{1}{\omega_d-\omega_s}\frac{1}{C}\right]$$

$$\Delta\xi_{LG}(\omega) = \frac{1}{2}\omega_g L_g$$

Where $K_{p4}$ and $K_{i4}$ are PI parameters of voltage outer loop, and $k_{p5}$ and $k_{i5}$ are PI parameters of current inner loop.

From the above formula, the filter reactance energy branch provides positive potential energy, which will increase the energy accumulated during the disturbance of the system. The potential energy term of the energy branch of the voltage outer loop is negative, which helps to offset the positive potential energy accumulated in the oscillation process. Moreover, because the filter reactance on the network side is much less than the reactance of the grid line, the potential energy coefficient of the filter reactance energy branch is much less than that of the voltage outer loop energy branch, so the potential energy generated by the filter reactance energy branch can be ignored. According to the potential energy terms in the two energy branches, potential energy compensation does not need to be made for the energy of the grid side channel.

The dissipation energy in grid-side energy channel is generated by grid-side outer-loop voltage and current energy branches and grid-side inner-loop current energy branch, and the corresponding dissipation energy coefficients are respectively:

$$\Delta\eta_{ig\_o}(\omega) = \frac{K_{p5}K_{p4}}{C}(-I_{dr0}K_{p1}K_{p3}I_{ds0}\omega_d a_3 - I_{dr0}K_{p1}K_{p3}U_{ds0}a_3\omega_d)$$

$$\Delta\eta_{ug\_o}(\omega) =$$
$$-\frac{K_{p5}K_{p4}}{C}(I_{dr0}a_3 K_{i1}K_{p3} + I_{ds0}a_3 K_{p1}K_{i3})\left[(\omega_d-\omega_s)L - \frac{1}{\omega_d-\omega_s}\frac{1}{C}\right] +$$
$$\frac{K_{p5}K_{i4}}{C}I_{dr0}K_{i1}K_{p3}I_{ds0}a_3\left[(\omega_d-\omega_s)L - \frac{1}{\omega_d-\omega_s}\frac{1}{C}\right] +$$
$$\frac{K_{p5}K_{p4}}{C}I_{dg0}Ra_3\omega_d$$

$$\Delta\eta_{ug\_i}(\omega) = \omega_d K_{p5}$$

It can be seen from the above formula, the dissipation energy coefficients of grid-side outer-loop current energy branch and grid-side inner-loop current energy branch are both positive, it has positive contribution to system stability coefficient. However, in grid-side outer-loop voltage energy branch, there exists a negative dissipation term generated by the coupling between series compensation line and grid-side converter control, the dissipation energy coefficient of which decreases as $\omega_d$ and series compensation degree increase. Thus it has negative contribution to system stability coefficient, which makes against the rapid convergence of system oscillation.

2) According to the energy change quantity and energy change trend identification, determine the target energy branch.

Through the analysis of step 1), it can be seen that the excitation voltage energy branch is the key energy branch which affects the potential energy and dissipation energy of the excitation channel, and the outer loop voltage energy branch of the grid side is the key energy branch which affects the dissipation energy of the grid side channel. Therefore, the two energy branches are determined as the target energy branches. The potential energy and dissipation energy compensation are made for the two energy branches respectively, which can increase the dissipation energy coefficient of the system and reduce the potential energy coefficient of the system, which can improve the stability level of the system and realize the rapid suppression of the sub-synchronous oscillation.

3) According to the target energy branch and its function, determine the corresponding energy compensation branch and its energy compensation function.

The relationship between stator voltage components and the potential energy of excitation voltage energy branch is:

$$\Delta W_{rp} = \int \Delta i_{sdq} K_n P_{LC}(\omega) d\Delta i_{sdq}^T$$

$$= \int \Delta i_{sdq} K_n P_{LC}(\omega) d P_{LC}^T(\omega) \Delta u_{sdq}^T$$

$$= \int \Delta i_{rdq}(-a_1 K_n) \begin{bmatrix} 0 & 1 \\ -1 & 0 \end{bmatrix} d\Delta u_{sdq}^T$$

where $$K_n = \begin{bmatrix} K_{p1}K_{p3}I_{ds0} & 0 \\ 0 & K_{p2}K_{p3}I_{ds0} \end{bmatrix},$$

$$P_{LC}(\omega) = \begin{bmatrix} 0 & (\omega_d - \omega_s)L - (\omega_d - \omega_s)^{-1}C^{-1} \\ -(\omega_d - \omega_s)L + (\omega_d - \omega_s)^{-1}C^{-1} & 0 \end{bmatrix}.$$

$K_{p1}$ and $K_{i1}$ are PI parameters of active outer loop, $K_{p2}$ and $k_{i2}$ are PI parameters of reactive outer loop, $k_{p3}$ and $K_{i3}$ are PI parameters of current inner loop. R is the resistance of series compensated line, L is the inductance of series compensated line, C is the capacitance of series compensated line. $\Delta i_{ds}$, $\Delta i_{qs}$, $\Delta u_{ds}$ and $\Delta u_{qs}$ are the variations of stator voltage and stator current in dq axis.

Stator voltage components generate a proportional gain on rotor voltage after it passes rotor converter, thus affecting the potential energy coefficient of excitation voltage energy branch. Therefore, a potential energy compensation branch reverse to the proportional gain of stator voltage components can be added to excitation voltage energy branch, so that the positive potential energy accumulated in the original branch can be offset. The added potential energy compensation branch can be expressed as:

$$\Delta W_{add\_u} = -\int \Delta i_{rdq} K_c \begin{bmatrix} 0 & 1 \\ -1 & 0 \end{bmatrix} d\Delta u_{sdq}^T =$$

$$-\frac{1}{a_1}\int \omega_d K_{pc1} R \Delta i_s^2 dt - \frac{1}{a_1} K_{pc1}\left[(\omega_d - \omega_s)L - \frac{1}{\omega_d - \omega_s}\frac{1}{C}\right]\Delta i_s^2$$

$$\Delta \xi_{cr\_p} = -\frac{1}{2a_1} K_{pc1}\left[(\omega_d - \omega_s)L - \frac{1}{\omega_d - \omega_s}\frac{1}{C}\right]$$

$$\Delta \eta_{cr\_p} = -\frac{1}{a_1} \omega_d K_{pc1} R$$

Where $\Delta W_{add\_u}$ is the compensation potential energy of excitation channel, $K_{pc1}$ is the control parameter of energy compensation branch, $\Delta \xi_{cr\_p}$ is the potential energy coefficient of the energy compensation branch, $\Delta \eta_{cr\_p}$ is the dissipation energy coefficient of the energy compensation branch.

Figure 2:
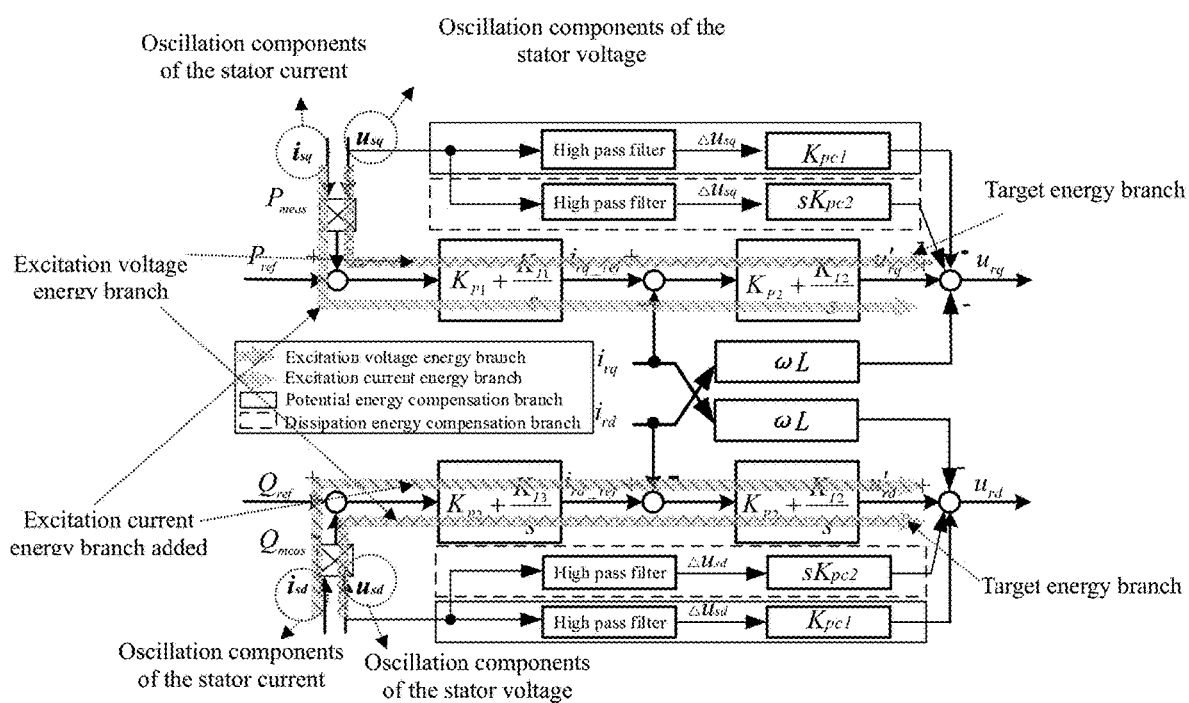
FIG. 2 is a control structure diagram of the rotor converter provided by the embodiment of the disclosure.

The corresponding control structure of the added energy compensation branch is shown in red line in FIG. 2, where the high-pass filter is used to filter the steady-state DC component of rotor current.

The relationship between stator voltage components and the dissipation energy of excitation voltage energy branch is:

$$\Delta W_{rd} = \int \Delta i_{sdq} K_d \frac{1}{\omega_d^2} P_{RLC}(\omega) d(\Delta i_{sdq}')^T$$

$$= \int \Delta i_{sdq} K_d \frac{1}{\omega_d^2} P_{RLC}(\omega) d P_{RLC}^T(\omega)(\Delta u_{sdq}')^T$$

$$= \int \Delta i_{rdq}(-a_1 K_d) \frac{1}{\omega_d^2} \begin{bmatrix} 0 & 1 \\ -1 & 0 \end{bmatrix} d(\Delta u_{sdq}')^T$$

where $$K_d = \begin{bmatrix} K_{p1}K_{p3}I_{ds0} & K_{i1}K_{p3}I_{ds0} \\ K_{i2}K_{p3}I_{ds0} & K_{p2}K_{p3}I_{ds0} \end{bmatrix}.$$

$K_{P1}$ and $K_{i1}$ are PI parameters of active outer loop, $K_{P2}$ and $k_{i2}$ are PI parameters of reactive outer loop, $k_{p3}$ and $K_{I3}$ are PI parameters of current inner loop.

Stator voltage components generate a differential gain on rotor voltage after it passes rotor converter, thus affecting the dissipation energy in excitation channel. According to formula above, a dissipation energy compensation branch reverse to the differential gain of stator voltage components can be added to excitation voltage energy branch, so that the original negative dissipation energy component in the system can be offset, and system dissipation energy coefficient can be improved. The corresponding control structure of the added energy compensation branch is shown in dotted box in FIG. 2. The added dissipation energy compensation branch can be expressed as:

$$\Delta W_{add\_u} = -\int \Delta i_{rdq} K_c \begin{bmatrix} 0 & 1 \\ -1 & 0 \end{bmatrix} d(\Delta u_{sdq}')^T =$$

$$\frac{1}{a_1}\int \omega_d^2 K_{pc2}\left[(\omega_d - \omega_s)L - \frac{1}{\omega_d - \omega_s}\frac{1}{C}\right]\Delta i_s^2 dt + \frac{1}{a_1}\omega_d K_{pc2} R\Delta i_s^2$$

$$\Delta \xi_{cr\_d} = a_1^{-1} \omega_d K_{pc2} R$$

$$\Delta \eta_{cr\_d} = \frac{1}{a_1} \omega_d^2 K_{pc2}\left[(\omega_d - \omega_s)L - \frac{1}{\omega_d - \omega_s}\frac{1}{C}\right]$$

Where $\Delta W_{add\_ud}$ is the compensation dissipation energy of the excitation channel, $\Delta \xi_{cr\_d}$ is the potential energy coefficient of the energy compensation branch and $\Delta \eta_{cr\_d}$ is the dissipation energy coefficient of the energy compensation branch.

The relationship between stator voltage components and the negative dissipation energy of outer-loop voltage energy branch is:

$$\Delta W_{gd} = \int \Delta i_{sd} K_d \frac{1}{\omega_d^2} P_{LC}(\omega) d\Delta i_{sd}'$$

$$= \int \Delta i_{sd} K_{dg} \frac{1}{\omega_d^2} P_{LC}(\omega) d P_{LC}^T(\omega) \Delta u_{sd}'$$

$$= \int \Delta i_{gd}(a_3 K_{dg}) \frac{1}{\omega_d^2} \begin{bmatrix} 0 & 1 \\ -1 & 0 \end{bmatrix} d\Delta u_{sd}'$$

where $K_{dg} = -K_{p5}K_{p4}(I_{dr0}K_{i1}K_{p3} + I_{ds0}K_{p1}K_{i3})/C$.

Figure 3:
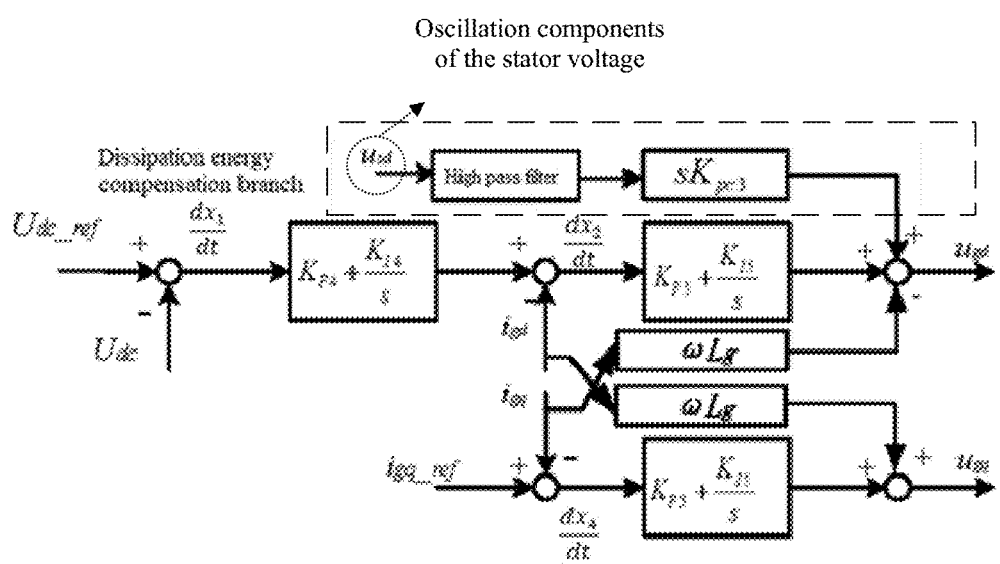
FIG. 3 is a control structure diagram of the grid side converter provided by the embodiment of the present disclosure.

Stator voltage components generate a differential gain on grid-side voltage after it passes grid-side converter, thus affecting the dissipation energy in grid-side channel. Therefore, a dissipation energy compensation branch reverse to the differential gain of stator voltage components can be added to grid-side channel, the control structure of which is shown in FIG. 3.

The added dissipation energy compensation branch can be expressed as:

$$\Delta W_{add\_ug} = -\int \Delta i_{gq} K_c \begin{bmatrix} 0 & 1 \\ -1 & 0 \end{bmatrix} d\Delta u'_{sd} =$$

$$-\frac{1}{2a_3}\int \omega_d^2 K_{pc3}\left[(\omega_d - \omega_s)L - \frac{1}{\omega_d - \omega_s}\frac{1}{C}\right]\Delta i_s^2 dt - \frac{1}{2a_3}\omega_d K_{pc3}R\Delta i_s^2$$

$$\Delta \xi_{cr\_g} = -\frac{1}{2a_3}\omega_d K_{pc3}R$$

$$\Delta \eta_{cr\_g} = -\frac{1}{2a_3}\omega_d^2 K_{pc3}\left[(\omega_d - \omega_s)L\frac{1}{\omega_d - \omega_s}\frac{1}{C}\right]$$

where $a_3$ is the proportion coefficient between grid-side current and stator current, $a_3 > 0$.

The influence of each energy compensation branch on the fundamental frequency low voltage ride through function of DFIG after introducing energy compensation branch is evaluated, and the energy compensation branch with fundamental frequency characteristic compatibility is selected.

The relationship between stator voltage and rotor current after energy compensation branch is introduced can be described as:

$$\begin{cases} a_2\Delta i_{rd\_c} + R_r\Delta i_{rd\_c} - (L_rL_s - L_m^2)\omega_2\Delta i_{rq\_c}/L_s = K_{pc1}\Delta u_{sd} + K_{pc2}\Delta \dot{u}_{sd} \\ a_2\Delta i_{rq\_c} + R_r\Delta i_{rq\_c} + (L_rL_s - L_m^2)\omega_2\Delta i_{rd\_c}/L_s = K_{pc1}\Delta u_{sq} + K_{pc2}\Delta \dot{u}_{sq} \end{cases}$$

where $\Delta i_{rd\_c}$ and $\Delta i_{rq\_c}$ are respectively variations of d-axis and q-axis components of the rotor current generated by energy compensation branch.

Suppose d-axis and q-axis disturbance components are generated by stator voltage, during short circuit fault:

$$\begin{cases} \Delta u_{sd} = U_0\cos(\omega_v t) \\ \Delta u_{sq} = -U_0\sin(\omega_v t) \end{cases}$$

where $\omega_v = \omega_s - \omega_p$, $\omega_p$ is the oscillation frequency of disturbance component, which is usually oscillation frequency of low frequency.

Disturbance components generated by stator voltage are put into the relationship formula between stator voltage and rotor current after introducing energy compensation branch, expression of d-axis and q-axis forced components of rotor current generated by energy compensation branch can be obtained:

$$\begin{cases} \Delta i_{rd\_c} = A\cos(\omega_v t) + B\sin(\omega_v t) \\ \Delta i_{rq\_c} = (L_f L_s - L_m^2)\omega_2/L_s(a_2 B\omega_v + R_r A - K_c U_0)\cos(\omega_v t) + \\ \quad (L_r L_s - L_m^2)\omega_2/L_s(-a_2 A\omega_v + R_r B)\sin(\omega_v t) \end{cases}$$

The expressions of coefficients A and B are:

$$A = -\frac{\left[(a_2\omega_v - (L_rL_s - L_m^2)\omega_s/L_s)^2 + R_r^2\right]}{(R_r^2 + (L_rL_s - L_m^2)/L_s\omega_2 - a_2^2\omega_v^2)^2 + (2a_2 R_r\omega_v)^2}K_{pc1}R_r U_0 +$$

$$\frac{\left[(a_2\omega_v - (L_rL_s - L_m^2)\omega_s/L_s)^2 + R_r^2\right]}{(R_r^2 + (L_rL_s - L_m^2)/L_s\omega_2 - a_2^2\omega_v^2)^2 + (2a_2 R_r\omega_v)^2}$$

$$(K_{pc2}a_2\omega_v^2 L_s/(L_rL_s - L_m^2) + K_{pc2}\omega_v)U_0$$

$$B = \frac{2a_2 R_r^2\omega_v + ((L_rL_s - L_m^2)\omega_2/L_s - a_2\omega_v)^2}{(R_r^2 + (L_rL_s - L_m^2)\omega_2/L_s - a_2^2\omega_v^2)^2 + (2a_2 R_r\omega_v)^2}K_{pc1}U_0 -$$

$$\frac{2a_2 R_r^2\omega_v}{(R_r^2 + (L_rL_s - L_m^2)\omega_2/L_s - a_2^2\omega_v^2)^2 + (2a_2 R_r\omega_v)^2}$$

$$(K_{pc2}a_2\omega_v^2 L_s/(L_rL_s - L_m^2) + K_{pc2}\omega_v)U_0$$

In the above formula, the term containing $K_{pc1}$ is the variation of rotor current generated by potential energy compensation branch. Since $a_2 < 0$, $A < 0$ and $B < 0$, i.e. variations of d-axis and q-axis rotor current generated by potential energy compensation branch are both negative, it contributes to decrease the rotor current during LVRT (Low voltage ride through) in some degree. However, since the oscillation frequency $\omega_p$ of stator voltage generated during LVRT is relatively small, and the value of oscillation frequency co is much larger than the values of PI parameters in dq coordinate system, the values of $A_{(1)}$ and $B_{(1)}$ are relatively small and scarcely affected by the parameters of energy compensation branch. Therefore, potential energy compensation branch has relatively small impact on LVRT capability of DFIG, scarcely changing the fundamental frequency characteristics of system.

The term containing $K_{pc2}$ is the variation of rotor current generated by dissipation energy compensation branch. Affected by $\omega_v$ and $a_2$, both $A_{(2)}$ and $B_{(2)}$ are above 0, i.e. dissipation energy compensation branch will increase the rotor current during LVRT. As the parameters of dissipation energy compensation branch increase, the amplitude of rotor current will further increase, even reaching the limited value, making it difficult for rotor converter to operate normally and stably, finally causing the system to go unstable.

Based on the above analysis, the dissipation energy compensation branch in excitation channel will worsen LVRT performance of DFIG, thus only potential energy compensation in excitation voltage energy branch is applied to excitation channel, as shown in the solid box in FIG. 4. While energy compensation branch in grid-side channel will not change the value of rotor current during LVRT, thus dissipation energy compensation is applied to grid-side channel.

Although the above method can realize the corresponding energy compensation branch, that is, the control strategy, sometimes the energy compensation branch cannot meet the stability requirement of multiple frequency bands. Therefore, when the variation of rotor current and stator voltage does not meet the stability requirement in sub-synchronous and super-synchronous frequency band of DFIG, the sub/super-synchronous frequency stability coefficient ratio is taken as the objective function, the parameters in the compensation function are optimized with the constraint that the energy compensation branch meets the stability requirements of sub-synchronous and super-synchronous frequency bands.

Specifically, sub/super-synchronous frequency stability coefficient ratio index is constructed and can be expressed as:

$$\sigma = \left|\frac{S_{sub}}{S_{super}}\right|$$

-continued $$S_{sub}(K) = \int_{\omega_1}^{\omega_2} \mu(\omega, K)d\omega - \int_{\omega_1}^{\omega_2} \mu(\omega, K)d\omega$$

$$S_{super}(K) = \int_{\omega_1}^{\omega_2} \mu(\omega, K)d\omega - \int_{\omega_1}^{\omega_2} \mu(\omega, K)d\omega$$

Where σ is sub/super-synchronous frequency stability coefficient ratio index, $\omega_1$, $\omega_2$ are selected as the upper and lower limits of sub-synchronous and super-synchronous frequency bands respectively. $S_{sub/super}(K)$ represents the influence degree of energy compensation branch on system stability coefficient in sub/super-synchronous frequency band. Consider that the dangerous frequency bands where sub/super-synchronous oscillation may occur due to the introduction of series compensation line to DFIG are 5 Hz-30 Hz and 70 Hz-95 Hz, [2π5~2π30] is chosen as the integration interval of $S_{sub}(K)$, and [2π70~2π95] is chosen as the integration interval of $S_{super}(K)$.

According to the stability requirements of potential energy coefficient and dissipation energy coefficient on full frequency band, the parameter boundary of energy compensation branch meeting the stability requirements of sub/super synchronous full frequency is calculated, and the parameter search range is determined. The constraint conditions are as follows:

$$\text{s.t.} \begin{cases} \min_{5 \leq \omega \leq 95} \eta(\omega, K) > 0 \\ \min_{5 \leq \omega \leq 95} \xi(\omega, K) > 0 \end{cases}$$

Where $\xi(\omega, K)$ is the potential energy coefficient, $\eta(\omega, K)$ is the dissipation energy coefficient.

Set the initial values of parameters of energy compensation branch as $K_{pc1(0)}$ and $K_{pc2(0)}$. According to the stochastic gradient method, parameters $K_{pc1(1)}$ and $K_{pc2(1)}$ are updated in the direction of its negative gradient. If certain group of parameters satisfies the constraint conditions above, this group of parameters is a feasible solution. If certain group of parameters does not satisfy the constraints, then the step size of negative gradient is regulated and this group of parameters is re-searched and updated again until any feasible solution is found.

Sub/super-synchronous frequency stability coefficient ratio index $\sigma_{(i)}$ corresponding to updated parameters $K_{pc1(i)}$ and $K_{pc2(i)}$ is calculated. If $\sigma_{(i+1)} > \sigma_{(i)}$, $K_{pc1(i+1)}$ and $K_{pc2(i+1)}$ is the current optimal solution; otherwise, repeat Step 2 and re-search the feasible solution.

Repeat the search process until the number of iterations is satisfied. The current optimal solution is the optimal parameters of energy compensation branch.

In conclusion, by optimizing the parameters of the compensation function, the control strategy can be further optimized, to make this control strategy meet the requirements of each frequency band.

The preferred embodiment is described in detail below in combination with the figures. It should be emphasized that the following description is only illustrative and is not intended to limit the scope of the disclosure and its disclosure.

To verify the feasibility of the proposed method in real system, according to the network topology and parameters of a real wind farm, DFIG parameter setting is shown in Table 1. First, the variation of dissipation energy coefficient and potential energy coefficient as the oscillation frequency and parameters of energy compensation branches vary is calculated, and according to the proposed parameter optimization scheme, the optimal parameters of energy compensation branches are determined. Further, with hardware-in-loop simulation tests, the effectiveness of the proposed control strategy in different oscillation cases and its compatibility with DFIG fundamental frequency characteristics are verified.

TABLE 1

DFIG PARAMETER SETTING

| Parameter | Sign | Value | Parameter | Sign | Value |
|---|---|---|---|---|---|
| Rated power | Pm | 1.5 MW | Rotor resistance | Rr | 0.05631 pu |
| Rated frequency | f | 50 Hz | Stator leakage inductance | Ls | 0.1 pu |
| Stator rated voltage | Us | 0.69 kV | Rotor leakage inductance | Lr | 0.03129 pu |
| Stator resistance | Rs | 0 pu | Mutual inductance | Lm | 0.13129 pu |

Figure 4A:
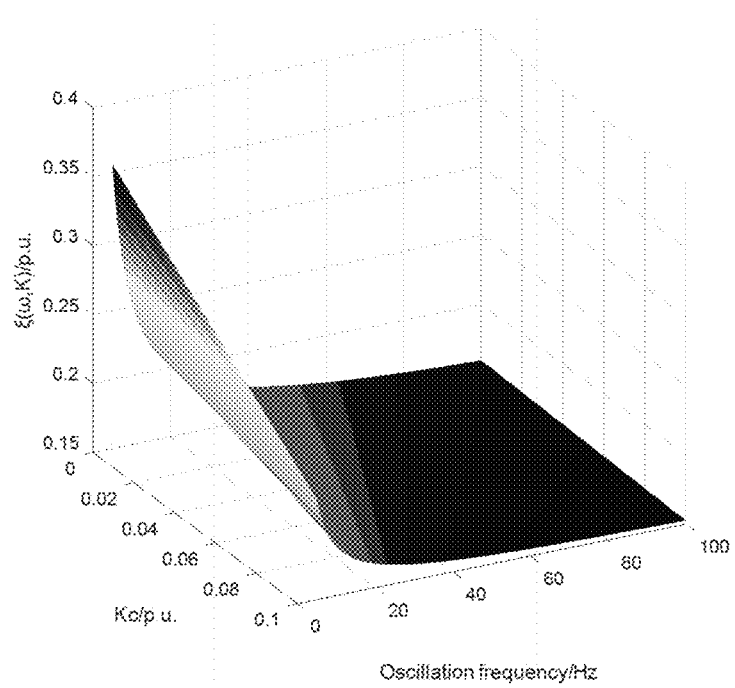
FIG. 4A is a change diagram of system potential energy coefficient and oscillation frequency after the energy remodeling of excitation voltage channel provided by the embodiment of the disclosure.
Figure 4B:
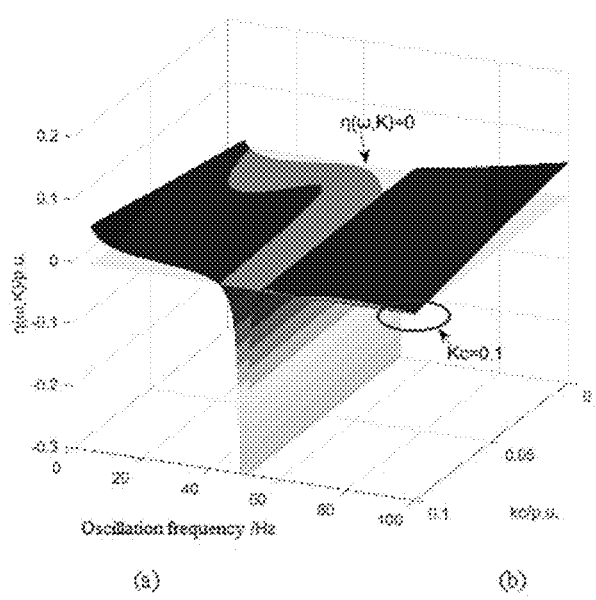
FIG. 4B is a variation diagram of the dissipation coefficient with the parameters of the energy compensation branch and the oscillation frequency provided by the embodiment of the present disclosure.

Operate energy compensation branch design device and the result is:

After energy compensation is added to excitation voltage energy branch, the variation trends of potential energy coefficient and dissipation energy coefficient of the system as the oscillation frequency and parameter of energy compensation branch vary are shown in FIGS. 4A-4B. The variation of potential energy coefficient of the system after introducing excitation voltage energy compensation branch is shown in FIG. 4A. It can be seen that, the remodeled excitation voltage energy branch has obvious compensation effect on potential energy in sub-synchronous frequency band. System potential energy coefficient gradually decreases as the parameter of energy compensation branch increases, and the stability level of system gradually improves. In super-synchronous frequency band, the compensation effect of potential energy compensation term is relatively smaller than that in sub-synchronous frequency band, but system potential energy coefficient still gradually decreases as the parameter of energy compensation branch increase, which contributes to decrease the energy accumulated during system oscillation and accelerate the converging of system oscillation.

The variation of system dissipation energy coefficient after excitation voltage energy compensation branch is introduced is shown in FIG. 4B. It can be seen that, the added energy compensation branch can increase system dissipation energy coefficient in sub-synchronous frequency band. However, there is the following problem in super-synchronous frequency band: system dissipation energy coefficient decreases due to negative compensation effect on dissipation energy. Thus, when setting the parameter of energy compensation branch, the requirement on dissipation energy compensation in super-synchronous frequency band should be considered.

Figure 5A:
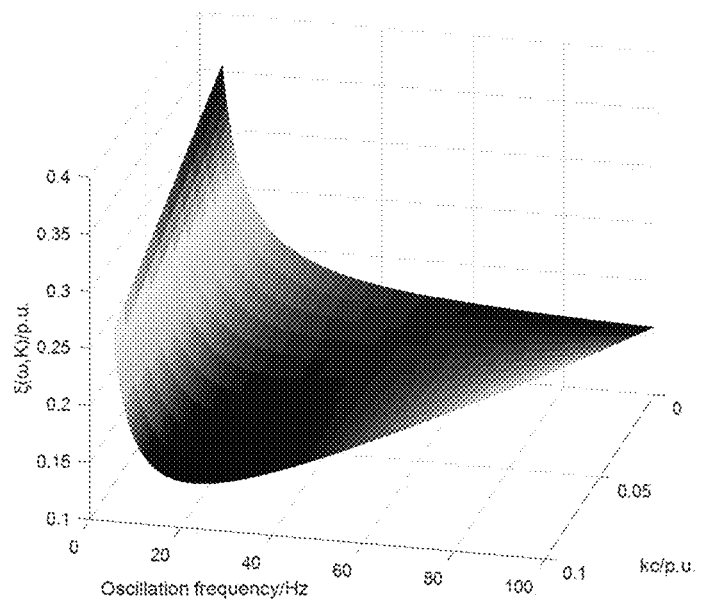
FIG. 5A is a variation diagram of the system potential energy coefficient with the parameters of energy compensation branch and oscillation frequency after introducing the branch energy at the network side provided by the embodiment of the disclosure.
Figure 5B:
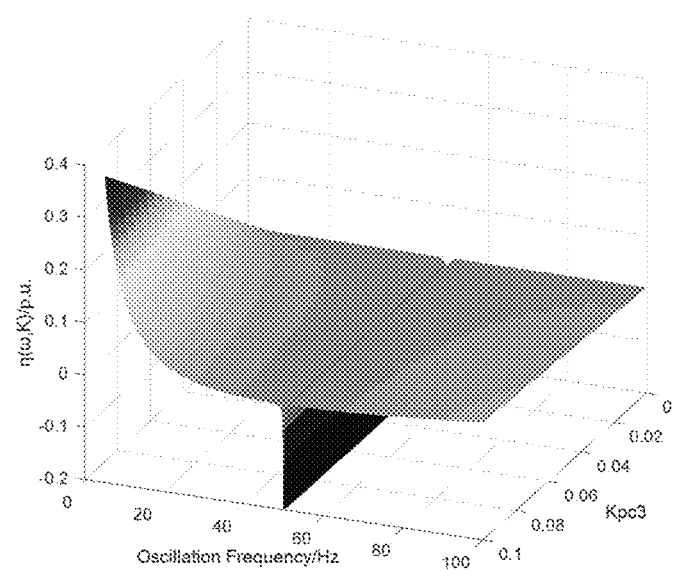
FIG. 5B is a variation diagram of the dissipation energy coefficient with the parameters of energy compensation branch and oscillation frequency after introducing the branch energy at the network side provided by the embodiment of the disclosure.

After the energy compensation branch is added to grid-side channel, the variation curves of potential energy coefficient and dissipation energy coefficient of the system as the parameter of energy compensation branch and oscillation frequency vary are shown in FIGS. 5A-5B.

FIG. 5A depicts the variation of system potential energy coefficient as the parameter of energy compensation branch of grid-side and oscillation frequency vary. It can be seen that, in sub-synchronous frequency band, the energy compensation branch can reduce the potential energy coefficient of the system and improve system stability level. However, in super-synchronous frequency band, the energy compensation branch will exhibit positive compensation effect on system potential energy and increase the potential energy coefficient of the system. Besides, as the parameter of energy compensation branch increases, its potential energy compensation effect also gradually increases, which will lower the stability level of system in super-synchronous frequency band. Therefore, when setting the parameter of energy compensation branch of grid-side channel, the requirement on potential energy compensation in super-synchronous frequency band should be considered.

FIG. 5B depicts variation of system dissipation energy coefficient as the parameter of energy compensation branch of grid-side and oscillation frequency vary. The energy compensation branch obviously increases system dissipation energy coefficient in sub-synchronous frequency band, thus accelerating the converging of sub-synchronous oscillation. In super-synchronous frequency band, the positive dissipation compensation effect of the energy compensation branch is relatively smaller than that in sub-synchronous frequency band. However, as the parameter of energy compensation branch increases, the energy compensation branch still exhibits positive dissipation compensation effect, which contributes to improve the stability level of system in super-synchronous frequency band.

Operate the basic frequency function compatibility evaluation device, and the result is:

Since the dissipation energy compensation branch in excitation channel will worsen LVRT performance of DFIG, thus only potential energy compensation in excitation voltage energy branch is applied to excitation channel. While energy compensation branch in grid-side channel will not change the value of rotor current during LVRT, thus dissipation energy compensation is still applied to grid-side channel.

Figure 6:
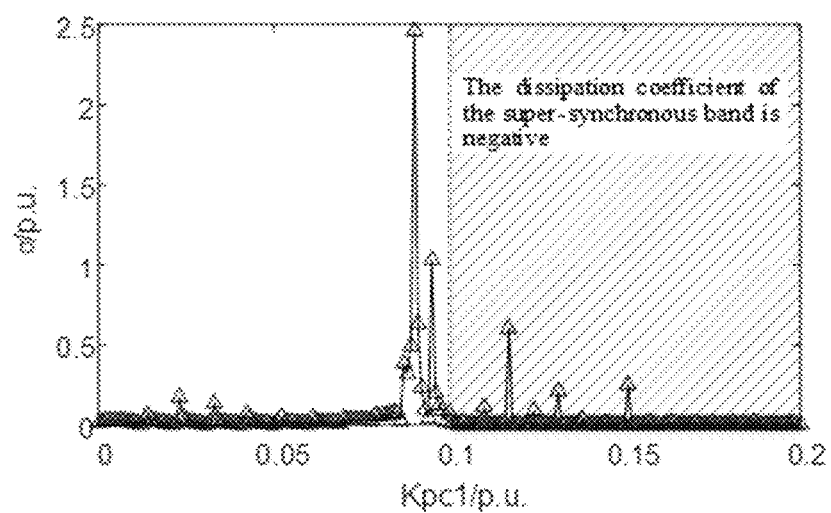
FIG. 6 is a variation diagram of the sub/super-synchronous frequency stability coefficient ratio index with the parameters of the energy compensation branch of the excitation channel provided by the embodiment of the disclosure.

Operate the second processor of parameter optimization, and the result is:

Build parameter optimization model of energy compensation branch in multiple frequency bands, and the optimal parameter of energy compensation branch $K_{pc1}$ is determined by the stochastic gradient method. According to the constraints of dissipation energy coefficient in super-synchronous frequency band, calculate the parameter boundary corresponding to $$\min_{70 \leq \omega \leq 95} \eta(\omega, K) = 0,$$

so that the selection range of $K_{pc1}$ can be determined to be between 0 and 0.1p.u., in which the optimization of $K_{pc1}$ is shown in FIG. 6. It can be seen that, when $K_{pc1}$ gradually increases from 0.01p.u., because the potential energy compensation effect of the compensation branch in sub-synchronous frequency band is much greater than its dissipation energy compensation effect in super-synchronous frequency band, sub/super-synchronous frequency stability coefficient ratio index of the system is also increased. When $K_{pc1}$ reaches 0.09p.u., sub/super-synchronous frequency stability coefficient ratio index reaches the maximum value, i.e. the relative influence degree of energy compensation branch on the stability level of in super-synchronous frequency band is the minimum. When $K_{pc1}$ is greater than 0.09p.u., the compensation effect of compensation branch on dissipation energy in super-synchronous frequency band gradually becomes prominent, and stability coefficient in super-synchronous frequency band drops acutely, thus sub/super-synchronous frequency stability coefficient ratio index drops. Therefore, the optimal parameter of excitation voltage energy compensation branch is determined to be 0.09p.u.

Figure 7:
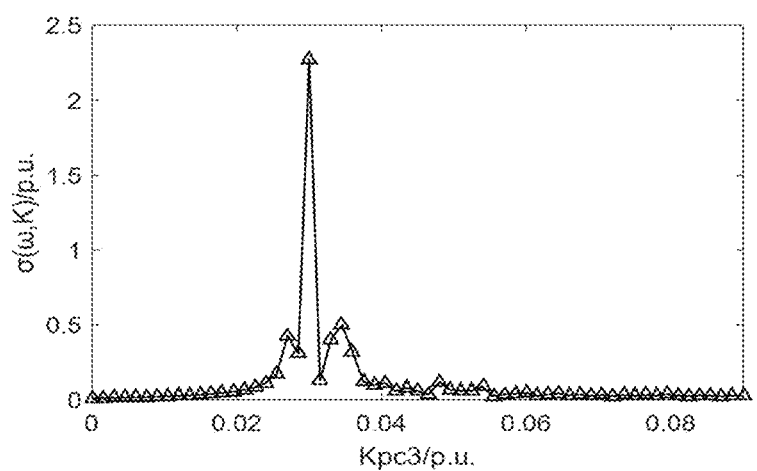
FIG. 7 is a variation diagram of the sub/super-synchronous frequency stability coefficient ratio index with the parameters of the energy compensation branch of the network side channel provided by the embodiment of the disclosure.

Build parameter optimization model of grid-side energy compensation branch in multiple frequency bands, and the optimal parameter of energy compensation branch $K_{pc3}$ is determined by the stochastic gradient method. The optimization of $K_{pc3}$ is shown in FIG. 7. It can be seen that, when $K_{pc3}$<0.03p.u., because the dissipation energy compensation effect of compensation branch in sub-synchronous frequency band gradually increases as $K_{pc3}$ increases, and its potential energy compensation effect in super-synchronous frequency band is relatively small, the sub/super-synchronous frequency stability coefficient ratio index is gradually increased. When $K_{pc3}$=0.03p.u., the sub/super-synchronous frequency stability coefficient ratio index reaches the maximum value, i.e. the relative influence degree of compensation branch on the stability level in super-synchronous frequency band is the minimum. When $K_{pc3}$>0.03p.u., since potential energy coefficient in super-synchronous frequency band increases acutely as $K_{pc3}$ increases, the sub/super-synchronous frequency stability coefficient ratio index gradually drops. Therefore, the optimal parameter of grid-side energy compensation branch is determined to be $K_{pc3}$=0.03p.u.

Figure 8:
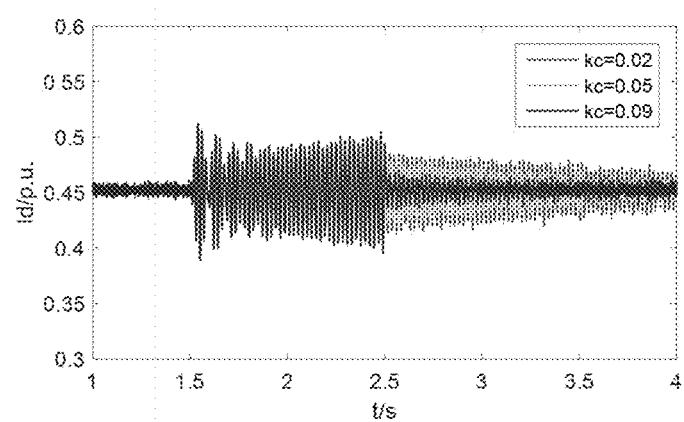
FIG. 8 is simulation result of the excitation voltage energy branch compensation provided by the embodiment of the disclosure.

Operate result output device, and the result is:

It can be seen from FIG. 8 that, sub-synchronous oscillation excited by the series compensation system exhibits diverging trend. Without control, the system will gradually diverge to go unstable. After energy compensation branch is switched on at t=2.5 s, since the accumulated potential energy of system is offset by the energy compensation branch, the oscillation amplitude of the system drops. And the bigger parameter $K_{pc1}$ is, the more obvious the compensation effect on system potential energy is. When $K_{pc1}$=0.09p.u., the oscillation amplitude drops to ⅕ of the original value. Meanwhile, since the accumulated potential energy of the system decreases, the dissipation intensity of system can meet the requirement on energy dissipation during oscillation. It can be seen that, the oscillation converges faster and reaches stable state in 0.5 s, thus the stability level of sub/super-synchronous oscillation is greatly improved.

Figure 9:
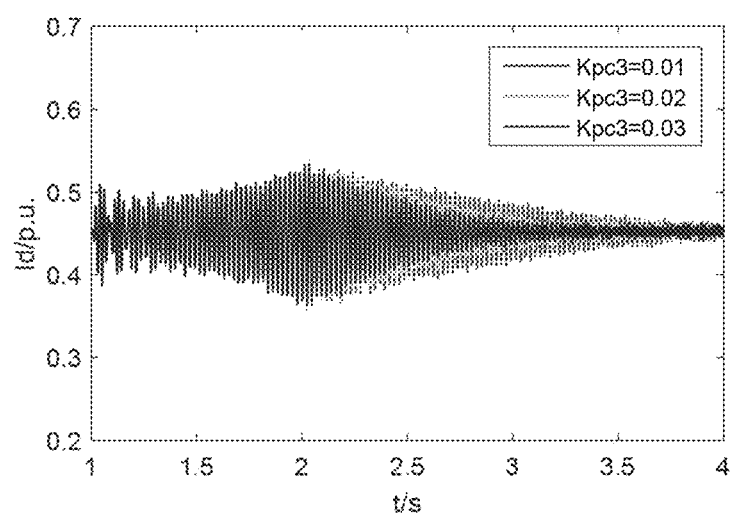
FIG. 9 is simulation result of the network side energy branch compensation provided by the embodiment of the disclosure.

It can be seen from FIG. 9 that, at the instant when grid-side energy compensation branch is switched on, system oscillation amplitude scarcely changes. This is because, the potential energy compensation term in compensation branch is relatively small, thus it does not affect the accumulation of potential energy during oscillation. However, since the dissipation energy compensation effect of grid-side energy compensation branch is relatively big, system dissipation intensity obviously increases after compensation branch is switched on, and the oscillation of d-axis current turns from diverging to converging. As $K_{pc3}$ increases, the dissipation energy compensation effect is more obvious, and the converging of system oscillation also gradually speeds up.

Suppose LC series compensation line is switched on at t=1.5 s with the series compensation degree being 22%, 28%, 34%, 40% and 43%. The frequencies of sub-synchronous oscillation excited in DFIG-integrated power system are respectively 5 Hz, 5.33 Hz, 6 Hz, 6.66 Hz and 7 Hz. In the above five oscillation cases, excitation voltage and grid-side energy compensation branches are both switched on at t=2.5 s. The oscillation curves of d-axis current and the oscillation spectrums of grid-side current are shown in FIG. 10.

Figure 10:
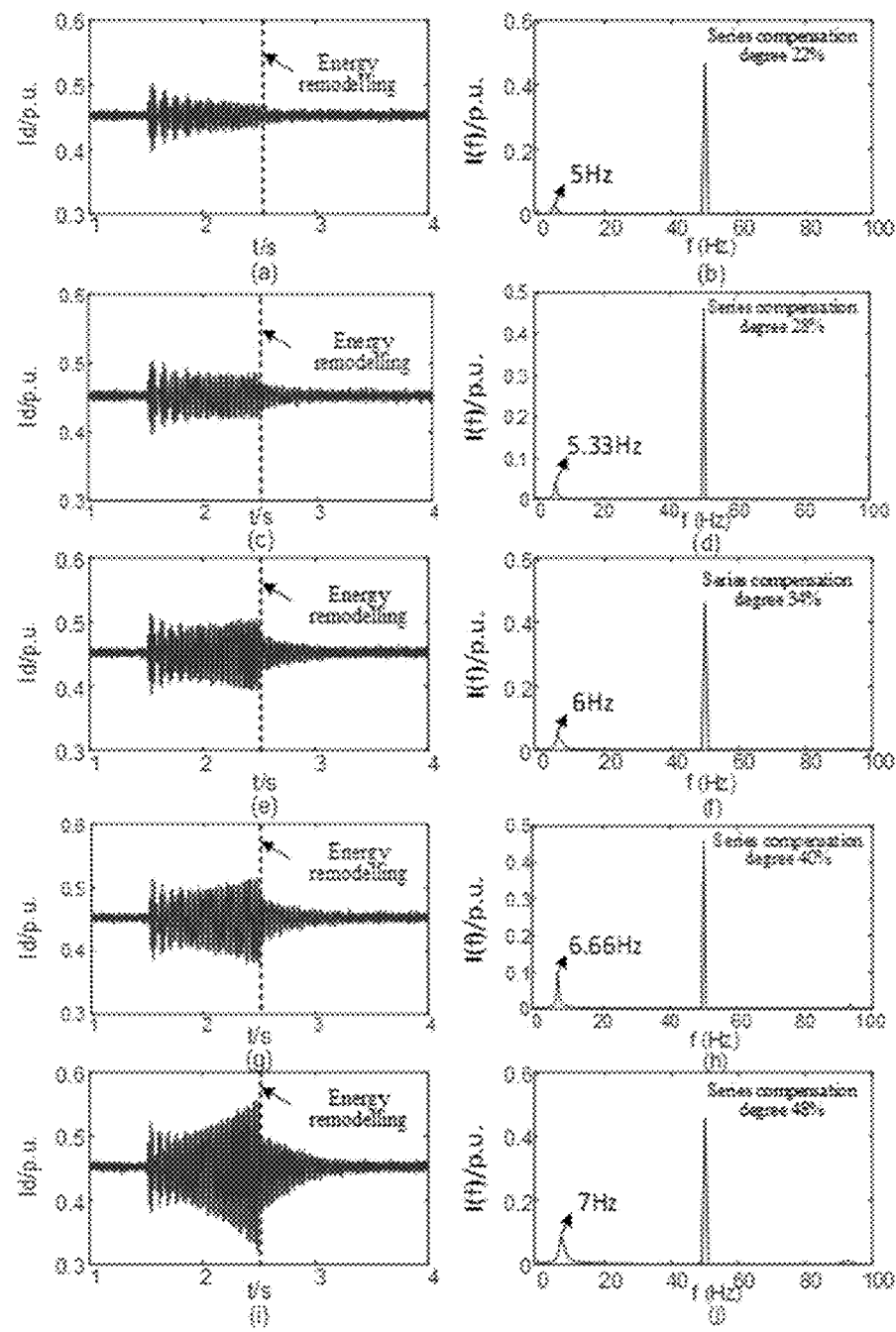
FIG. 10 is a diagram of the active damping control effect under different series compensation degree provided by the embodiment of the disclosure.

It can be seen from FIGS. 10 (a) and (b) that, when LC series compensation line is switched on with series compensation degree being 22%, the sub-synchronous oscillation excited in the system converges slowly. After energy compensation branch is switched on at t=2.5 s, the oscillation converges faster and the system reaches stable state at t=2.6 s.

When series compensation degree increases to 28%, the oscillation curve of d-axis current and the oscillation spectrum of grid-side current are shown in FIGS. 10(c) and (d). It can be seen that, constant-amplitude sub-synchronous oscillation is excited in the system with the oscillation frequency being 5.33 Hz. After energy compensation branch is switched on, the oscillation amplitude of d-axis current instantly drops due to potential energy compensation effect. At the same time, since dissipation energy coefficient increases, system oscillation gradually turns from constant-amplitude oscillation to stable state.

When series compensation degree increases from 34% to 48%, diverging oscillation is excited in the system with the oscillation frequency being 6 Hz-7 Hz, and in these cases the oscillation curves of d-axis current and the oscillation spectrums of grid-side current are shown in FIG. 10(e)-(j). It can be seen that, as series compensation degree increases, the oscillation amplitude of system also increases, so does the diverging speed. After energy compensation branch is switched on at t=2.5 s, since the compensation effect of energy compensation branch on system dissipation energy and potential energy also increases as series compensation degree rises, in these cases the oscillation amplitude of d-axis current drops to below ½ of the original value and system oscillation converges to stable state in 0.5 s.

Figure 11:
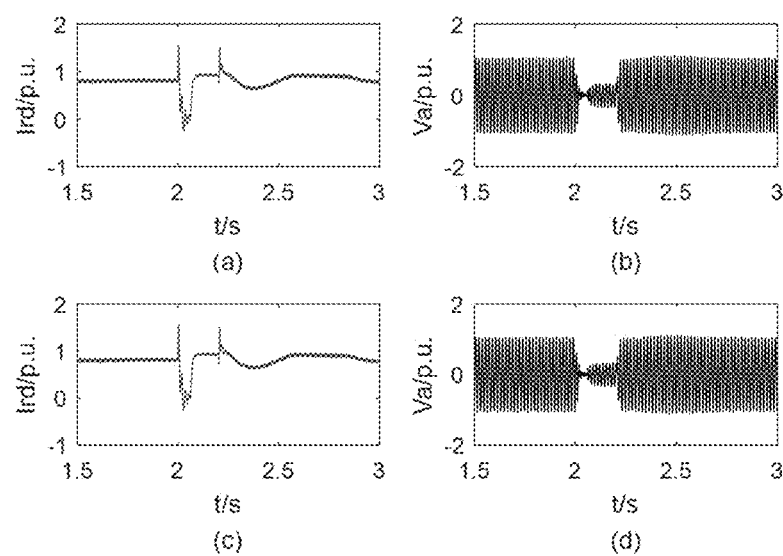
FIG. 11 is waveforms of fan port voltage and rotor current in the low voltage ride through process with and without energy compensation branch provided by the embodiment of the disclosure.

Set three-phase short circuit fault on the line via which DFIG is integrated to the grid, to simulate LVRT course of DFIG. Suppose the fault lasts for 0.2 s and the ground resistance is 0.01Ω. During LVRT, the simulation curves of DFIG terminal bus voltage and rotor d-axis current are shown in FIG. 11, where FIGS. 11 (a) and (b) are simulation results with energy compensation branches, FIGS. 11 (c) and (d) are simulation results without energy compensation branches. During LVRT, the variation curves of DFIG rotor current are shown in FIGS. 11 (a) and (c). It can be seen that, there is no obvious difference between rotor currents of DFIG with energy compensation branches and without energy compensation branches, i.e., energy compensation branches do not affect DFIG induction current and electromotive force during LVRT, and normal operation of rotor converter can be guaranteed. The variation curves of DFIG terminal voltage are shown in FIGS. 11 (b) and (d). It can be seen that, the response characteristic of DFIG terminal voltage during LVRT is scarcely affected by energy compensation branches. Meanwhile, the LVRT performance of DFIG is normal both without energy compensation branches and with energy compensation branches, i.e., the proposed energy compensation branches are compatible with dynamic response ability of fundamental frequency of DFIG.

Figure 13:
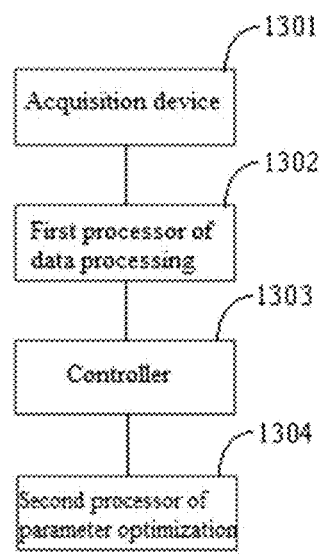
FIG. 13 is a diagram of an active damping control system for sub-synchronous oscillation of DFIG provided by the disclosure.

As shown in FIG. 13, the embodiment of the disclosure provides an active damping control system for sub-synchronous oscillation of DFIG, which includes: an acquisition device 1301, a first processor of data processing 1302, a controller 1303 and a second processor of parameter optimization 1304;

The acquisition device 1301 is used for acquiring oscillation components of stator current and stator voltage;

The first processor of data processing 1302 is used to determine each energy branch in DFIG converter according to the flow path of oscillation components of the stator current and the stator voltage in DFIG converter; according to oscillation components of the stator current and the stator voltage, determine the corresponding functions of each energy branch; according to the corresponding functions of each energy branch, determine the energy compensation branch and its corresponding energy compensation function in DFIG converter;

The controller 1303 is used to control the sub-synchronous oscillation of DFIG by controlling the energy compensation branch according to the energy compensation function.

The second processor of parameter optimization 1304 is used to optimize the parameters in the compensation function to meet the stability requirement of the wind turbine in both sub-synchronous and super-synchronous frequency band, taking the sub/super-synchronous frequency stability coefficient ratio as the objective function and the energy compensation branch meeting the sub/super synchronous frequency stability requirement as the constraint condition;

Where the objective function is:

$$\sigma = \left|\frac{S_{sub}}{S_{super}}\right|$$

$$S_{sub}(K) = \int_{\omega_1}^{\omega_2} \mu(\omega, K)d\omega - \int_{\omega_1}^{\omega_2} \mu(\omega, K)d\omega$$

$$S_{super}(K) = \int_{\omega_1}^{\omega_2} \mu(\omega, K)d\omega - \int_{\omega_1}^{\omega_2} \mu(\omega, K)d\omega$$

Where $\sigma$ is sub/super-synchronous frequency stability coefficient ratio index, $\omega_1$, $\omega_2$ are selected as the upper and lower limits of sub-synchronous and super-synchronous frequency bands; $S_{sub/super}(K)$ represents the influence degree of energy compensation branch on stability coefficient in sub/super-synchronous frequency band.

The constraint condition is:

$$s.t. \begin{cases} \min_{5 \le \omega \le 95} \eta(\omega, K) > 0 \\ \min_{5 \le \omega \le 95} \xi(\omega, K) > 0 \end{cases}$$

Where $\xi(\omega,K)$ is the potential energy coefficient, $\eta(\omega,K)$ is the dissipation energy coefficient.

Wherein each energy branch in the DFIG converter comprises: each energy branch in the excitation converter of the DFIG and each energy branch in the grid side converter of the DFIG.

The first processor of data processing is configured that according to the stator current, the general formula of the function corresponding to each energy branch in the DFIG converter is determined, as shown in the following Formula 1:

$$\Delta W_{DFIG} = \tfrac{1}{2}\xi(\omega)\Delta i_{dqs}^2 - \int \eta(\omega)\Delta i_{dqs}^2 dt \qquad \text{Formula 1}$$

where $\Delta i_{dqs}$ is d-axis and q-axis oscillation component of the stator current, $\omega$ is oscillation frequency; $\xi(\omega)$ is a potential energy coefficient; $\eta(\omega)$ is a dissipation energy coefficient.

The first processor of data processing is configured that ratio of the potential energy coefficient and the dissipation energy coefficient is constructed as stability coefficient index, as shown in the following Formula 2, $$\mu(\omega) = \frac{\eta(\omega)}{\xi(\omega)} \qquad \text{Formula 2}$$

the first processor of data processing is configured for according to the stability coefficient index and the corresponding function of each energy branch, determining energy change quantity and energy change trend identification of each energy branch; determining a target energy branch according to the energy change quantity and energy change trend identification; according to the target energy branch and its function, determining the corresponding energy compensation branch and its energy compensation function; where the energy change quantity comprises potential energy change quantity and dissipation energy change quantity, and the energy change trend identification comprises potential energy change trend identification and dissipation energy change trend identification; the energy compensation branch comprises a reverse potential energy compensation branch and a reverse dissipation energy compensation branch.

The first processor of data processing is configured for: according to the function of the stator voltage component and the potential energy of the target energy branch, determining potential energy increment of the target energy branch; according to the potential energy increment of the target energy branch, determining the reverse potential energy compensation branch and its corresponding function, and using the reverse potential energy compensation branch to offset the potential energy increment.

The first processor of data processing is configured for according to the function of the stator voltage component and the dissipation energy of the target energy branch, determining dissipation energy increment of the target energy branch; according to the dissipation energy increment of the target energy branch, determining the reverse dissipation energy compensation branch and its corresponding function, where the reverse dissipation energy compensation branch is used to offset the dissipation energy increment.

The system further comprises: through the energy compensation function, calculating variation of the rotor current and variation of the stator voltage caused by the energy compensation branch; detecting whether the variation of the rotor current and the variation of the stator voltage meet the conditions for the stability of the fundamental frequency dynamic characteristics of the DFIG; executing the energy compensation branch when the variation of the rotor current and the variation of the stator voltage meet the condition that the fundamental frequency dynamic characteristics of wind turbine is stable.

A non-transitory machine-readable storage medium comprising instructions that when executed cause a processor of a computing device to: collecting oscillation component(s) of stator current and/or stator voltage; according to flow path of the oscillation component(s) of the stator current and/or the stator voltage in DFIG converter, determining each energy branch in the DFIG converter; according to the oscillation component(s) of the stator current and/or the stator voltage, determining corresponding function of each energy branch; according to the corresponding function of each energy branch and converter parameters, determining the energy compensation branch and its corresponding energy compensation function in the DFIG converter; according to the energy compensation function, controlling the sub-synchronous oscillation of the DFIG by controlling the energy compensation branch.

It should be noted that the active damping control system for sub-synchronous oscillation of DFIG in FIG. 13 can implement the active damping control method for sub-synchronous oscillation of DFIG provided by any of the above embodiments.

It can be understood by those skilled in the technical field that all or part of the process of realizing the method in the above embodiment can be completed by instructing the relevant hardware through a computer program, and the program can be stored in a computer-readable storage medium. The computer-readable storage medium is a magnetic disk, an optical disk, a read-only storage memory or a random storage memory, etc.

The above is only a better specific embodiment of the disclosure, but the protection scope of the disclosure is not limited to this. Any change or replacement that can be easily thought of by a person familiar with the technical field within the technical scope of the disclosure shall be included in the protection scope of the disclosure.

The foregoing descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described in order to explain certain principles of the disclosure and their practical disclosure, to thereby enable others skilled in the art to make and utilize various exemplary embodiments of the present disclosure, as well as various alternatives and modifications thereof. It is intended that the scope of the disclosure be defined by the Claims appended hereto and their equivalents.

What is claimed is:

1. An active damping control method for sub-synchronous oscillation of DFIG, comprising:
    collecting oscillation components of stator current and stator voltage;
    determining excitation current energy branch and excitation voltage energy branch in the DFIG converter according to flow path of the oscillation components of the stator current and the stator voltage in DFIG converter;
    determining a function corresponding to the excitation current energy branch and excitation voltage energy branch in the DFIG converter according to the oscillation component(s) of the stator current, as shown in the following Formula 1:

$$\Delta W_{DFIG} = \tfrac{1}{2}\xi(\omega)\Delta i_{dqs}^{2} - \int \eta(\omega)\Delta i_{dqs}^{2} dt \qquad \text{Formula 1}$$

where $\Delta i_{dqs}$ is d-axis and q-axis oscillation component of the stator current dq, $\omega$ is oscillation frequency; $\xi(\omega)$ is a potential energy coefficient; $\eta(\omega)$ is a dissipation energy coefficient;
    constructing ratio of the potential energy coefficient and the dissipation energy coefficient as stability coefficient index, as shown in the following Formula 2, $$\mu(\omega) = \frac{\eta(\omega)}{\xi(\omega)} \qquad \text{Formula 2}$$

determining energy change quantity and energy change trend identification of the excitation current energy branch and excitation voltage energy branch according to the stability coefficient index and the function, wherein the energy change quantity comprises potential energy change quantity and dissipation energy change quantity, and the energy change trend identification comprises potential energy change trend identification and dissipation energy change trend identification;

determining a target energy branch and a target energy branch function according to the energy change quantity and the energy change trend identification, wherein the target energy branch is one of the excitation current energy branch and the excitation voltage energy branch, the target energy branch function comprises a target energy branch potential energy function and a target energy branch dissipation energy function;

determining energy increment of the target energy branch according to the target energy branch and the target energy branch function, wherein the energy increment comprises potential energy increment and dissipation energy increment;

determining an energy compensation branch and an energy compensation function according to the energy increment of the target energy branch, wherein the energy compensation branch comprises a potential energy compensation branch and a dissipation energy compensation branch, and the energy compensation branch is for offsetting the energy increment, the energy compensation function comprises a potential energy compensation function and a dissipation energy compensation function;

controlling a sub-synchronous oscillation of the DFIG by controlling the energy compensation branch according to the energy compensation function.

2. The method according to claim 1, the method further comprises:

calculating variation of the rotor current and variation of the stator voltage caused by the energy compensation branch through the energy compensation function;

detecting whether the variation of the rotor current and the variation of the stator voltage meet the conditions for the stability of the fundamental frequency dynamic characteristics of the DFIG;

executing energy compensation when the variation of the rotor current and the variation of the stator voltage meet the conditions for the stability of the fundamental frequency dynamic characteristics of the DFIG.

3. The method according to claim 2, the method further comprises:

when the variation of the rotor current and the variation of the stator voltage do not meet the conditions for the stability of the fundamental frequency dynamic characteristics of the DFIG, optimizing the parameters in the energy compensation function by taking sub/super-synchronous frequency stability coefficient ratio as an objective function and the energy compensation branch meeting the sub/super synchronous frequency stability requirement as the constraint condition;

where the objective function is:

$$\sigma = \left| \frac{S_{sub}}{S_{super}} \right|$$

$$S_{sub}(K) = \int_{\omega_1}^{\omega_2} \mu(\omega, K) d\omega - \int_{\omega_1}^{\omega_2} \mu(\omega, K) d\omega$$

$$S_{super}(K) = \int_{\omega_1}^{\omega_2} \mu(\omega, K) d\omega - \int_{\omega_1}^{\omega_2} \mu(\omega, K) d\omega$$

where $\sigma$ is sub/super-synchronous frequency stability coefficient ratio; $\omega_1$, $\omega_2$ are selected as upper and lower limits of sub-synchronous and super-synchronous frequency bands; $s_{sub/super}(K)$ represents influence degree of the energy compensation branch on system stability coefficient in sub/super-synchronous frequency band; the constraint condition is:

$$s.t. \begin{cases} \min_{5 \leq \omega \leq 95} \eta(\omega, K) > 0 \\ \min_{5 \leq \omega \leq 95} \xi(\omega, K) > 0 \end{cases}$$

where $\xi(\omega, K)$ is the potential energy coefficient, $\eta(\omega, K)$ is the dissipation energy coefficient.

4. An active damping control system for sub-synchronous oscillation of DFIG comprises: an acquisition device, a first processor of data processing and a controller;

the acquisition device is configured for acquiring oscillation components of stator current and stator voltage;

the first processor of data processing is configured for:

determining excitation current energy branch and excitation voltage energy branch in the DFIG converter according to flow path of the oscillation components of the stator current and the stator voltage in DFIG converter, determining a function corresponding to the excitation current energy branch and excitation voltage energy branch in the DFIG converter according to the oscillation component(s) of the stator current, as shown in the following Formula 1:

$$\Delta W_{DFIG} = \frac{1}{2} \xi(\omega) \Delta i_{dqs}^2 - \int \eta(\omega) \Delta i_{dqs}^2 dt \quad \text{Formula 1}$$

where $\Delta i_{dqs}$ is d-axis and q-axis oscillation component of the stator current, $\omega$ is oscillation frequency; $\xi(\omega)$ is a potential energy coefficient; $\eta(\omega)$ is a dissipation energy coefficient, constructing ratio of the potential energy coefficient and the dissipation energy coefficient as stability coefficient index, as shown in the following Formula 2, $$\mu(\omega) = \frac{\eta(\omega)}{\xi(\omega)} \quad \text{Formula 2}$$

determining energy change quantity and energy change trend identification of the excitation current energy branch and excitation voltage energy branch according to the stability coefficient index and the function, wherein the energy change quantity comprises potential energy change quantity and dissipation energy change quantity, and the energy change trend identification comprises potential energy change trend identification and dissipation energy change trend identification, determining a target energy branch and a target energy branch function according to the energy change quantity and the energy change trend identification, wherein the target energy branch is one of the excitation current energy branch and the excitation voltage energy branch, the target energy branch function comprises a target energy branch potential energy function and a target energy branch dissipation energy function, determining energy increment of the target energy branch according to the target energy branch and the target energy branch function, wherein the energy increment comprises potential energy increment and dissipation energy increment, determining an energy compensation branch and an energy compensation function according to the energy increment of the target energy branch, wherein the energy compensation branch comprises a potential energy compensation branch and a dissipation energy compensation branch, and the energy compensation branch is for offsetting the energy increment, the energy compensation function comprises a potential energy compensation function and a dissipation energy compensation function;

the controller is configured for controlling a sub-synchronous oscillation of the DFIG by controlling the energy compensation branch according to the energy compensation function.

5. The system according to claim 4, the system also comprises: a second processor of parameter optimization;

the second processor of parameter optimization is configured to calculate variation of the rotor current and variation of the stator voltage caused by the energy compensation branch through the energy compensation function; detect whether the variation of the rotor current and the variation of the stator voltage meet the conditions for the stability of the fundamental frequency dynamic characteristics of the DFIG; and execute energy compensation when the variation of the rotor current and the variation of the stator voltage meet conditions for the stability of the fundamental frequency dynamic characteristics of the DFIG.

6. The system according to claim 5, wherein the second processor of parameter optimization is further configured to optimize parameters in the energy compensation function by taking sub/super-synchronous frequency stability coefficient ratio as an objective function and the energy compensation branch meeting the sub/super synchronous frequency stability requirement as the constraint condition, when the variation of the rotor current and the variation of the stator voltage do meet conditions for the stability of the fundamental frequency dynamic characteristics of the DFIG;

where the objective function is:

$$\sigma = \left| \frac{S_{sub}}{S_{super}} \right|$$

$$S_{sub}(K) = \int_{\omega_1}^{\omega_2} \mu(\omega, K) d\omega - \int_{\omega_1}^{\omega_2} \mu(\omega, K) d\omega$$

$$S_{super}(K) = \int_{\omega_1}^{\omega_2} \mu(\omega, K) d\omega - \int_{\omega_1}^{\omega_2} \mu(\omega, K) d\omega$$

where $\sigma$ is sub/super-synchronous frequency stability coefficient ratio index; $\omega_1$, $\omega_2$ are selected as upper and lower limits of sub-synchronous and super-synchronous frequency bands;

$S_{sub/super}$ (K) represents influence degree of the energy compensation branch on system stability coefficient in sub/super-synchronous frequency bands, the constraint condition is:

$$s.t. \begin{cases} \min_{5 \leq \omega \leq 95} \eta(\omega, K) > 0 \\ \min_{5 \leq \omega \leq 95} \xi(\omega, K) > 0 \end{cases}$$

where $\xi(\omega, K)$ is the potential energy coefficient, $\eta(\omega, K)$ is the dissipation energy coefficient.

* * * * *